United States Patent [19]

Stachoviak

[11] Patent Number: 4,968,153
[45] Date of Patent: Nov. 6, 1990

[54] INSIDE/OUTSIDE TEMPERATURE INDICATING DEVICE FOR MOTOR VEHICLES

[76] Inventor: John A. Stachoviak, 4536 Eaton Pl., Alexandria, Va. 22310

[21] Appl. No.: 419,529

[22] Filed: Oct. 10, 1989

[51] Int. Cl.⁵ .......................... G01K 5/08; G01K 1/14
[52] U.S. Cl. ...................... 374/189; 374/109; 374/190; 374/201; 374/208
[58] Field of Search ............... 374/189, 109, 190, 201, 374/208, 141

[56] References Cited

U.S. PATENT DOCUMENTS

| | | | |
|---|---|---|---|
| 1,081,139 | 12/1913 | Parliman | 374/189 |
| 1,641,500 | 9/1927 | Paul | 374/141 |
| 1,691,136 | 11/1928 | Schlaich | 374/189 |
| 2,803,137 | 8/1957 | Bradley | 374/208 |
| 2,846,881 | 8/1958 | Hobin | 374/189 |
| 3,074,275 | 1/1963 | Hobin | 374/189 |
| 3,177,717 | 4/1965 | Oveson | 374/189 |
| 3,196,684 | 7/1965 | Vernon | 374/189 |
| 3,396,582 | 8/1968 | Louks et al. | 374/189 |
| 3,518,884 | 7/1970 | Wood, Jr. | 374/189 |
| 3,532,480 | 10/1970 | D'Eustachio | 65/20 |
| 4,020,694 | 5/1977 | Mayhew | 374/189 |
| 4,182,182 | 1/1980 | Stortz | 374/141 |
| 4,336,712 | 6/1982 | Hawkins | 374/138 |
| 4,352,290 | 10/1982 | Neils | 374/110 |
| 4,610,863 | 9/1986 | Tewari | 423/338 |

FOREIGN PATENT DOCUMENTS

| | | |
|---|---|---|
| 3339898 | 5/1985 | Fed. Rep. of Germany . |
| 49956 | 9/1939 | France ............... 374/109 |
| 2033572 | 5/1980 | United Kingdom . |

Primary Examiner—William A. Cuchlinski, Jr.
Assistant Examiner—Diego F. F. Gutierrez

[57] ABSTRACT

This disclosure relates to an indoor-outdoor thermometer adapted to be used on motor vehicles. The structure, preferably of transparent plastic material, also includes the concept of insulating material in order to improve the accuracy of temperature measurements. In order to improve transparency through the device, the insulation is placed only on areas of the device closest to the temperature sensors. In order to provide maximum visibility through the device transparent insulation is preferentially used.

4 Claims, 2 Drawing Sheets

INSIDE/OUTSIDE TEMPERATURE INDICATING DEVICE FOR MOTOR VEHICLES

This invention relates to inside/outside thermometers for motor vehicles.

BACKGROUND OF THE INVENTION

Few motor vehicles are equipped with a device to determine the air temperature inside, or outside the motor vehicle.

This invention relates to a temperature indicating device for use inside a motor vehicle that will display both the air temperature outside the motor vehicles as well as the air temperature inside the vehicle.

There are some devices that have been patented that give a reading of outside temperature. For instance, Pauli: (Pat. No. 2839924) describes a thermometer for automobiles that can apparently be clipped onto a side window of an automobile. Hawkins: (Pat. No. 4336712) describes a device designed to be attached to an outside element of an automobile, such a a outside rear view mirror. Such devices can, of course, given only the external temperature. Vernon: (Pat. No. 3196684) describes an indoor/outdoor thermomenter unit for an automobile window wing. The unit will indicate the temperature inside and outside. Although some thought is given by the inventor to the effect of heat transfer through glass, the solution offered is to space the thermometer elements away from the glass. The design of the unit however, indicates that the spacing is minimal, at best, and heat transfer through the glass would be expected to have some effect on the temperature readings. Also, the unit of Vernon is designed to clip onto a window wing. Many of today's automobiles do not have window wings.

The need exists therefore for an indoor/outdoor thermometer device adapted for automobiles that can be mounted on a normal automobile window, that gives reasonably accurate temperature readings.

This invention will meet this need by providing a relatively low cost inside/outside thermometer, that is readily constructed, has good accuracy, that offers easy portability from sunny side to shady side, from front to rear, to another vehicle, or removed from the vehicle for safekeeping. In addition, the vehicle will be of a convenient, compact size, and because of its unique construction, will minimally restrict visibility through the window on which it is mounted.

SUMMARY OF THE INVENTION

The device consists of two fluid and tube type adjacent thermometers attached to a support, preferably constructed of clear acrylic plastic, allowing maximum visibility through the window on which it is mounted. Said support is configured to fit over the top edge of a motor vehicle window; the inside leg of the clip is about four inches long and can be shaped according to the size of the thermometers used in the construction of the device. The outside leg can be about two inches long and may be a variety of shapes.

The outside air indicating thermometer is constructed with a capillary tube that to protect it from damage, traverses the clip via a channel or groove in the outer surface of the clip to a sensing probe on the outside portion of the clip, where the sensing probe is exposed to the outside air temperature, thus displaying the outside air temperature on the thermometer that is attached to the inside portion of the clip. The thermometer, capillary tube and the sensing probe are attached to the support with a transparent glue.

The inside air indicating thermometer is attached to the support with "M" shaped, or the like, plastic fasteners, of sufficient height to allow the air inside the motor vehicle to flow freely around the thermometer, thus assuring an accurate measurement of the temperature inside the vehicle. A transparent glue is used to attach the fasteners and the thermometer to the support.

The inner surfaces of the support behind the thermometer, the capillary tube and the sensing probe that rest against the window glass are adequately insulated with insulationg of appropriate thickness, in order to prevent heat passing through the window glass from the outside to affect the inside thermometer, and to prevent heat passing through the glass from the inside to affect the sensing probe of the outside sensing element.

F and C temperature scales are provided on the face of the support.

The concept of indoor-outdoor thermometers is well established in the art. One form of such thermometers utilizes a thermometer element of conventional stem and bulb type for indicating the indoor temperature and for outdoor temperature indications, employs a remote reading thermometer element made of a glass stem positioned adjacent the indoor thermometer element and interconnected as by a length of metal capillary tubing to a remotely disposed liquid filled bulb located for exposure to outdoor temperature. Such thermometers are well known and no invention is claimed in such thermometers per se. Considerable detail of the construction of such devices is given in U.S. Pat. Nos. 3074275 and 28466881.

It is the object of this invention to provide a thermometric device that allows of measuring both the temperature within an automobile and the outside temperature.

It is a further object to provide such a device that is reasonably inexpensive, that can easily be moved from window to window of an automobile, that can easily be transfered to any other automobile, or that can be removed from the motor vehicle for safekeeping.

It is a further object of the invention to provide such a device that also gives reasonably accurate temperature readings.

It is a further object of the invention not only to provide maximum mobility, minimum cost, and reasonable accuracy but also to provide such a unit having minimum effect on the visibility through the windows of an automobile.

DESCRIPTION OF THE PREFERRED EMBODIMENT

Figure 1:
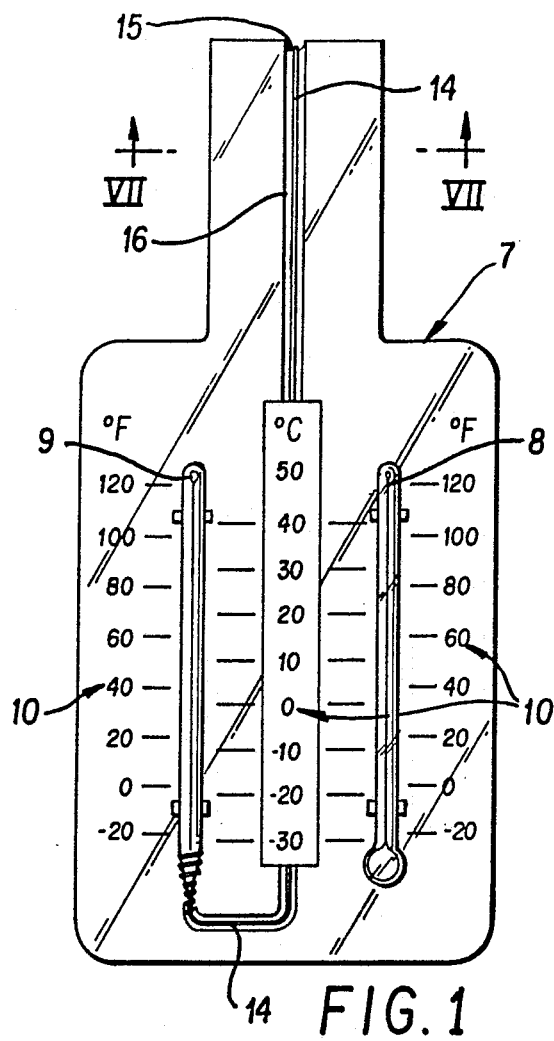
FIG. 1 is a front view of an inside/outside thermometer constructed in accordance with this invention.

Referring to the drawings, 8 designates the inside thermometer, 9 represents the outside temperature indicating thermometer with its associated capillary tubing 14 while 10 designates associated temperature scales. The support 7, although preferably of a transparent material, such as acrylics for maximum visibility through the window, can be constructed of any material, including metal. However, it is preferred that the support be constructed of a material that has heat insulative properties, such as any well known commercial plastic such as the above noted acrylic. The material of construction is, per se, not a critical element to the invention. Any material having sufficient mechanical strength can be used, although consideration should be given to the cost factor, since an object of the invention is to provide a relatively inexpensive device.

The inside registering thermometer 8 is preferably attached to the support 7 by "M" shaped fasteners 13, preferably of plastic material, although any material can be used. The fasteners should be of sufficient size to hold the body of the thermometer away from the support to allow air inside of the motor vehicle to flow freely around the thermometer, thus assuring an accurate measure of inside temperature.

Although two fasteners, one at the top and one at the bottom of the thermometer are sufficient, it is clear that any number can be used. The fasteners are preferentially transparent, but need not be so. Any material giving sufficient mechanical strength is comtemplated. The fasteners are preferably transparent and are attached to the support and the thermometer tube with a transparent adhesive, but any method of construction is comtemplated.

The outside temperature indicating thermometer 9 need not be attached to the support by fasteners allowing of air circulation around the tube, although a method of mounting similar to that of the inside thermometer can be used. The outside thermometer can be directly attached to the support using a variety of adhesive techniques, ranging from a simple adhesive to the concept of a two faced adhesive strip. The latter technique provides a layer of material preferentially having insulative properties between the support and the thermometer, improving the accuracy of the temperature indication.

An end of the outside temperature indicating thermometer terminates in a capillary tube 14 which serves to connect the thermometer tube to a remotely disposed sensor 11, using techniques described in U.S. Pat. Nos. 3074275 and 2846881.

The capillary tube 14 is led to the outside using a variety of methods.

The face of the support 7 can be grooved to allow the capillary tube to fit in the groove 16 flush with the face VII—VII of the support. The capillary passes over the top of the support in a groove, channel, or cut-out as indicated in 15 so that the window cannot close on the capillary. It is important that the capillary tube maintain a free unobstructed connection with the temperature sensing probe 11. The groove 16 conducting the capillary can be continued on the outside face of the support. The temperature sensor 11 per se at the end of the capillary is attached to the outside face of the support, in order to prevent the sensor from being bounced around when the motor vehicle is in motion, and to prevent the sensor from being blown about from the wind stream generated by movement. If desired, a housing can be attached over the sensor per se, in order to protect the sensor from the outside elements and to shield the sensor from direct sunlight. The housing per se must of course allow of free air access to the sensor. If desired, the sensor can be spaced away from the clip to allow of free air circulation.

Other methods of leading the capillary outside of the vehicle are possible. The capillary can be led down from the bottom of the thermometer in a groove, around the bottom of the support 7 preferably in a cut-out, groove or channel, and then around the back of the inside portion of the support, in a groove allowing the capillary to lie flush with the surface of the support. In this case the capillary groove need not pass through a cut-out or channel of the type of 15 since the support itself would prevent the window from contacting the capillary. The capillary groove can continue along the inner face of the outside section of the support and the capillary brought to the outside face of the outer support through a cut-out or groove of the type of 15. If preferred, a simple slit can be into the bottom of the outside support and the capillary passed through. The sensor is attached to the support as noted above.

Figure 4:
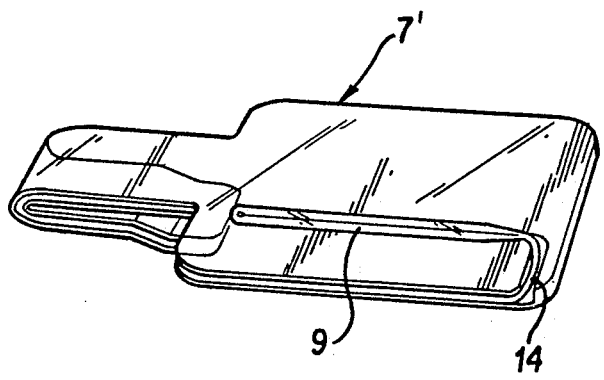
FIG. 4 is a side view of the support, the outside thermometer, and the capillary tube along the edge of the support.

Another variation contemplated in FIG. 4 is that the capillary is led through a groove to the outside edge of the support 7' and that the edge of the support is formed in the shape of a U, allowing the capillary to fit flush with the edge of the support. The groove along the edge of the support extends along the top of the support into the outer part of the support. The capillary is brought to the sensor using methods similar to those used for a groove on the back portion of the support.

Thickness of the support must take the diameter of the capillary into account.

A variety of other methods for leading the capillary to the outside sensor are available, taking into consideration that care must be used to prevent the capillary from being unduly bent, or twisted and otherwise constricted.

The thermometer scales 10 can be printed directly on the face of the support. Otherwise they can be individually printed on various materials and attached to the front face of the support. It is preferred, in the latter method that the material be transparent and that the materials are attached to the support using transparent glue. It is contemplated that both F and C scales are presented as is conventional with present day thermometers, but only one scale can be indicated if desired.

The outside section of the support can be of the same width as the inside section if desired. As the upper portion of the support is essentially the means to attach the device to the vehicle window and expose the sensing probe to the outside air, a variety of shapes may be used.

Figure 2:
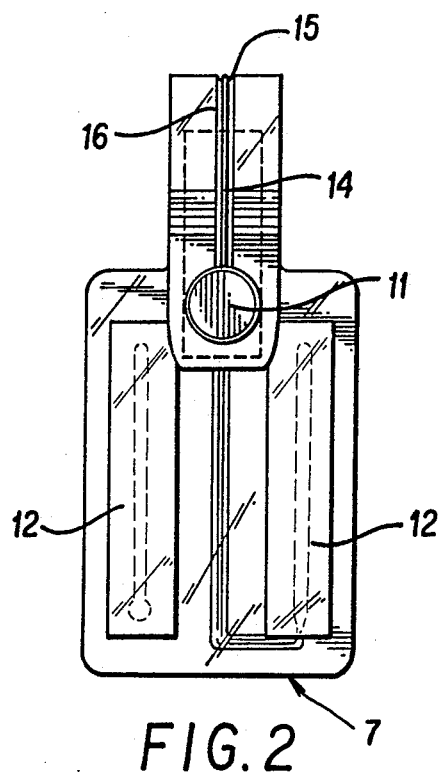
FIG. 2 is a back view of the inside/outside thermometer.
Figure 3:
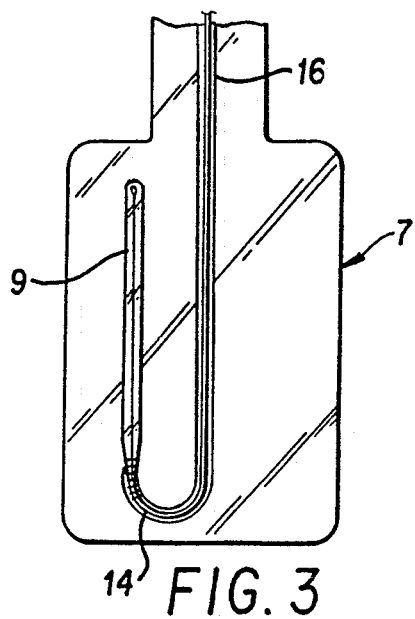
FIG. 3 is a front view of the support to which the outside thermometer and the capillary tube have been attached.
Figure 5:
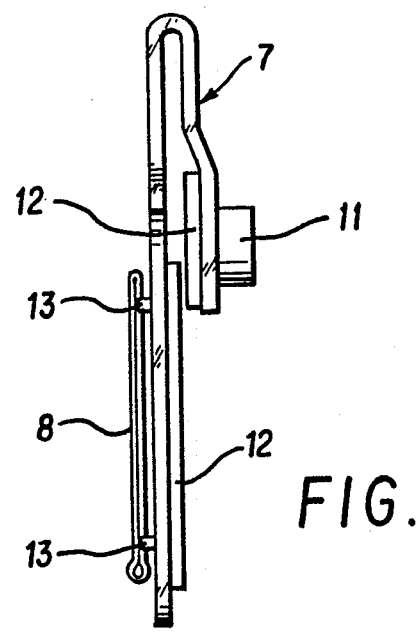
FIG. 5 is a right side view of the support, the inside temperature thermometer, the insulating material inside the support, and the sensor.
Figure 6:
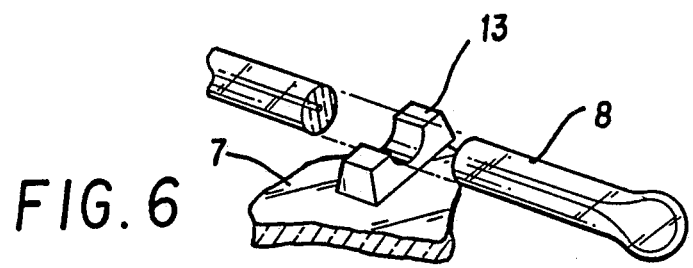
FIG. 6 is an enlarged view of the inside thermometer tube and the fastener used to attach the thermometer to the support.
Figure 7:
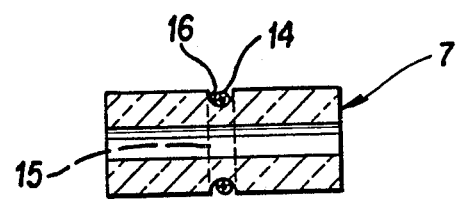
FIG. 7 is a sectional view taken across section lines VII—VII in FIG. 1.

An important element in this invention is the presence of insulating material 12 along the surfaces of the support that contact the glass of the window, as shown in FIG. 2 and FIG. 5. Since the thermometer is designed for use with automobiles, and cannot be mounted under ideal measuring conditions, it is apparent that some provisions are needed to prevent the accuracy of the temperature reading from being affected by heat transfer through the glass. Although spacing the thermometers away from the support helps to accomplish this, it is apparent that because of the highly variable conditions that the thermometer will be subjected to that further provisions are required. This is accomplished by the insulative material.

Although it is apparent that maximum insulation effects are gained by covering the entire surfaces of the support contacting the window glass, the insulation would reduce visibility through the window and support. It is not necessary that the insulation cover the entire surface of the support. The insulation need only be placed in an area behind the inside registering thermometer sufficient to prevent heat passing through the window from outside from impinging directly on the thermometer and that insulation be placed in an area behind the outside sensor to prevent heat passing through the window from the outside from affecting the sensor. Also, if the automobile is air conditioned, the relatively cool surfaces of the window glass would prevent the sensor from sensing the true outdoor temperature.

A large number of insulating materials are known and no extensive discussion is necessary. Suffice it to say that the material should be selected with regard to insulative efficiency, with regard to cost and with regard to weather conditions if insulation is exposed to outside conditions. In this case, it is well known that a variety of methods are available for sealing the insulating material from contact with the outside atmosphere.

It is apparent however, that the presence of conventional insulating material would affect visibility through the window and the thermometer unit. Since maximum visibility is always to be desired, it is apparent that any insulating material should preferably be transparent.

In recent years, a variety of such materials have become available.

In German Offenlegungsschrift DE No. 3339898, the concept of transparent foam cellular polymethylmethacrylate, or transparent porous glass is taught as thermal insulating layer for solar heating devices. U.S. Pat. No. 3532480 gives considerable detail on the manufacture of porous (multicellular) glass sheets having reasonably good insulating properties and with reasonable transparency. United Kingdom Patent Application No. 2033572 teaches a heat insulating structure transparent to solar radiation. This publication teaches the concept of two layers of transparent plastic material such as polyvinyl chloride heat sealed together around their edges and along a lattice of lines between such edges to provide an array of individually closed cavities which are filled with a gas (such as air) and which provide heat-insulating pockets. It is well known that polyvinyl chloride and related polymeric materials can be provided with additives to retard degradation of the polymer by the ultraviolet radiation in sunlight, and that such materials have reasonable weather resistant properties. U.S. Pat. No. 4610863 describes a process for forming transparent aerogel insulating arrays having excellent insulating properties along with high transparency. This material can be provided in thin sheets such as 0.7 cm. If necessary, in order to protect the material from deterioration from contact with the atmosphere, it can be heat sealed with layers of transparent polymers such as the above noted polyvinylchloride, using well known techniques.

The advantages of transparent insulation in association with an otherwise transparent thermometric device are immediately apparent.

Since the insulation is trasparent, it can be provided along the entire surface of the support in contact with the glass, for maximum insulative effects. As a cost consideration however, the insulation need only be provided in the rear of both the indoor thermometer and the outdoor temperature sensor.

There has been described a simple, reliable, low cost, easily transferable device for measuring both the inside and outside temperature of an automobile with reasonable accuracy and with no loss of visibility through a window to which the device is attached.

What is claimed is:

1. An inside/outside thermometer device for use in motor vehicles having two adjacent fluid and tube type thermometers and made part of a transparent support, said support configured to be placed over the top edge of a motor vehicle window, and having an inside portion and an outside portion, and having inner and outer surfaces on both the inside and the outside portions with an outside air indicating thermometer attached to the inside portion of the support and constructed with a capillary tube that tranverses the support to a sensor on the outside portion of the support exposed to the outside atmosphere and with an inside air temperature indicating thermometer also attached to the inside portion of the support so as to allow the air circulating inside the motor vehicle to flow freely around the thermometer, and wherein the inner surfaces of the support that contacts the window glass are adequately insulated to prevent heat passing through the window glass from the outside to affect the inside thermometer, and to prevent heat passing through the glass from the (outside) inside of the motor vehicle to affect the sensing probe of the outside sensing thermometer.

2. The device of claim 1, wherein the insulation is placed to cover only the back of the inside sensing thermometer, the back of the outside sensing thermometer and the back of the outside sensor in order to provide for visibility through the device.

3. The device of claim 1 wherein the insulation is transparent.

4. The device of claim 2 wherein the insulation is transparent.

* * * * *